United States Patent [19]

Nelson, Jr.

[11] Patent Number: 4,803,801
[45] Date of Patent: Feb. 14, 1989

[54] WEEDBEATER

[76] Inventor: Frederick S. Nelson, Jr., 10454 S. Jamestown, Tulsa, Okla. 74137

[21] Appl. No.: 53,389

[22] Filed: May 21, 1987

[51] Int. Cl.[4] .......................................... A01C 23/00
[52] U.S. Cl. ........................................ 47/1.5; 47/58
[58] Field of Search ..................... 47/1.5, 1.7, 58; 118/207; 222/174, 191, 628; 401/10; 74/501 A

[56] References Cited

U.S. PATENT DOCUMENTS

| | | | |
|---|---|---|---|
| 480,048 | 8/1892 | Stertz | 47/1.5 |
| 1,051,555 | 1/1913 | Cochran | 401/10 |
| 1,523,590 | 1/1925 | Hartshorn | 47/1.5 |
| 3,503,613 | 3/1970 | Caya | 74/501 A |
| 3,728,817 | 4/1973 | Huey et al. | 47/1.5 |
| 3,929,032 | 12/1975 | Kehm | 74/501 A |
| 4,126,962 | 11/1978 | Polcaro | 47/1.5 |
| 4,263,745 | 4/1981 | Salahshour | 47/1.5 |
| 4,291,491 | 9/1971 | Maddock | 47/1.5 |
| 4,467,558 | 8/1984 | Rathman | 47/1.5 |
| 4,716,677 | 1/1988 | Moore | 47/1.5 |

FOREIGN PATENT DOCUMENTS

| | | | |
|---|---|---|---|
| 7526824 | 9/1975 | Fed. Rep. of Germany | 47/1.5 |
| 2342655 | 9/1977 | France | 47/1.5 |

Primary Examiner—Robert A. Hafer
Assistant Examiner—Kevin G. Rooney
Attorney, Agent, or Firm—Head & Johnson

[57] ABSTRACT

An applicator for dispensing herbicides to weeds. It has a long handle which supports a herbicide supply container at the top. The other end of the handle supports a horizontal member which has a relatively flat sponge assembly which receives herbicide from the long hollow handle which is connected to the herbicide supply reservoir. A roller assembly is supported from the lower end of the handle and has a roller arm so that movement of the roller arm causes the roller to roll across the surface of the sponge assembly. A hand operated lever at the top of the handle rotates the roller arm through a pull string. In another embodiment, the flat herbicide receiving pad is supported from an axle between two wheels and the rollers are supported in a reel type assembly.

5 Claims, 5 Drawing Sheets

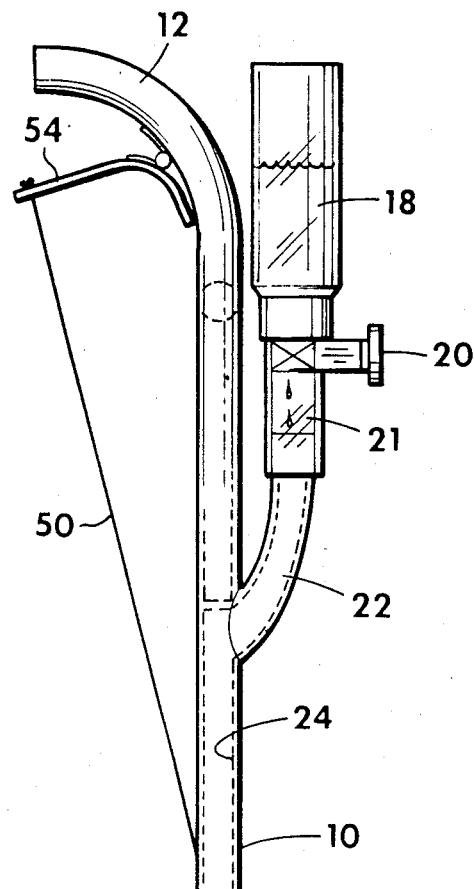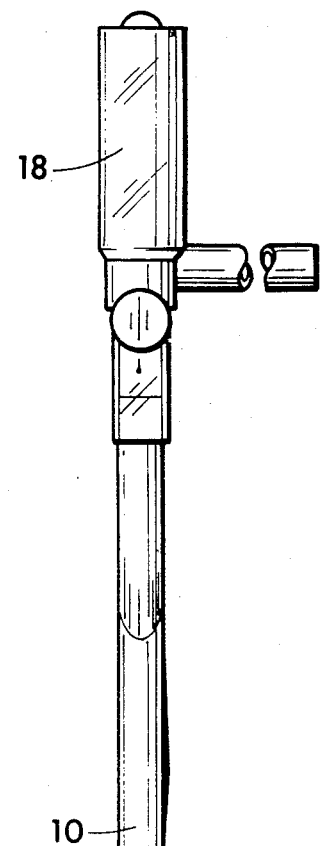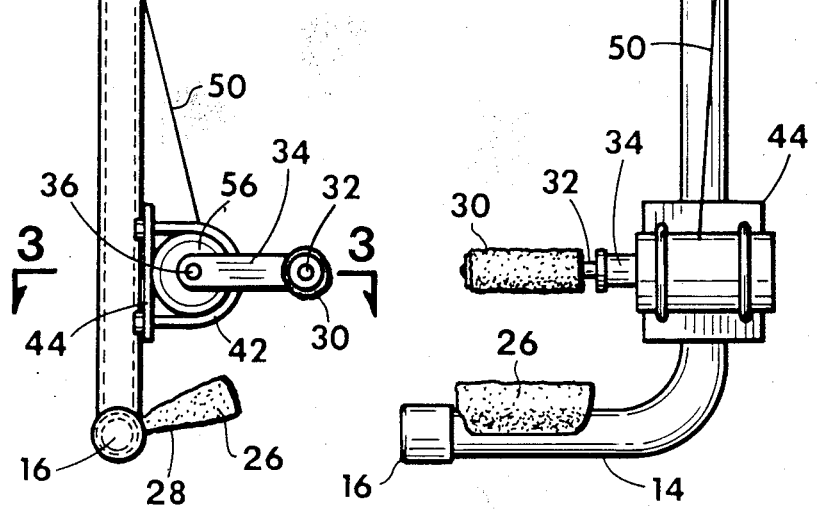

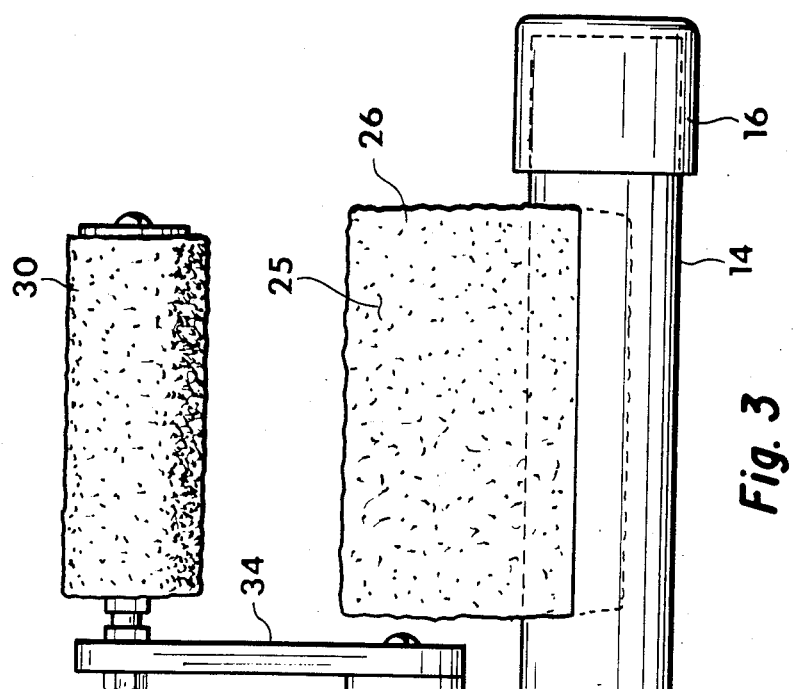
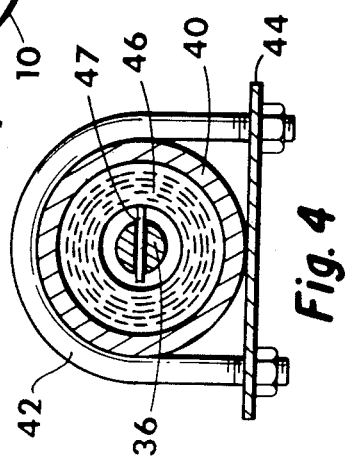
Fig. 3
Fig. 4

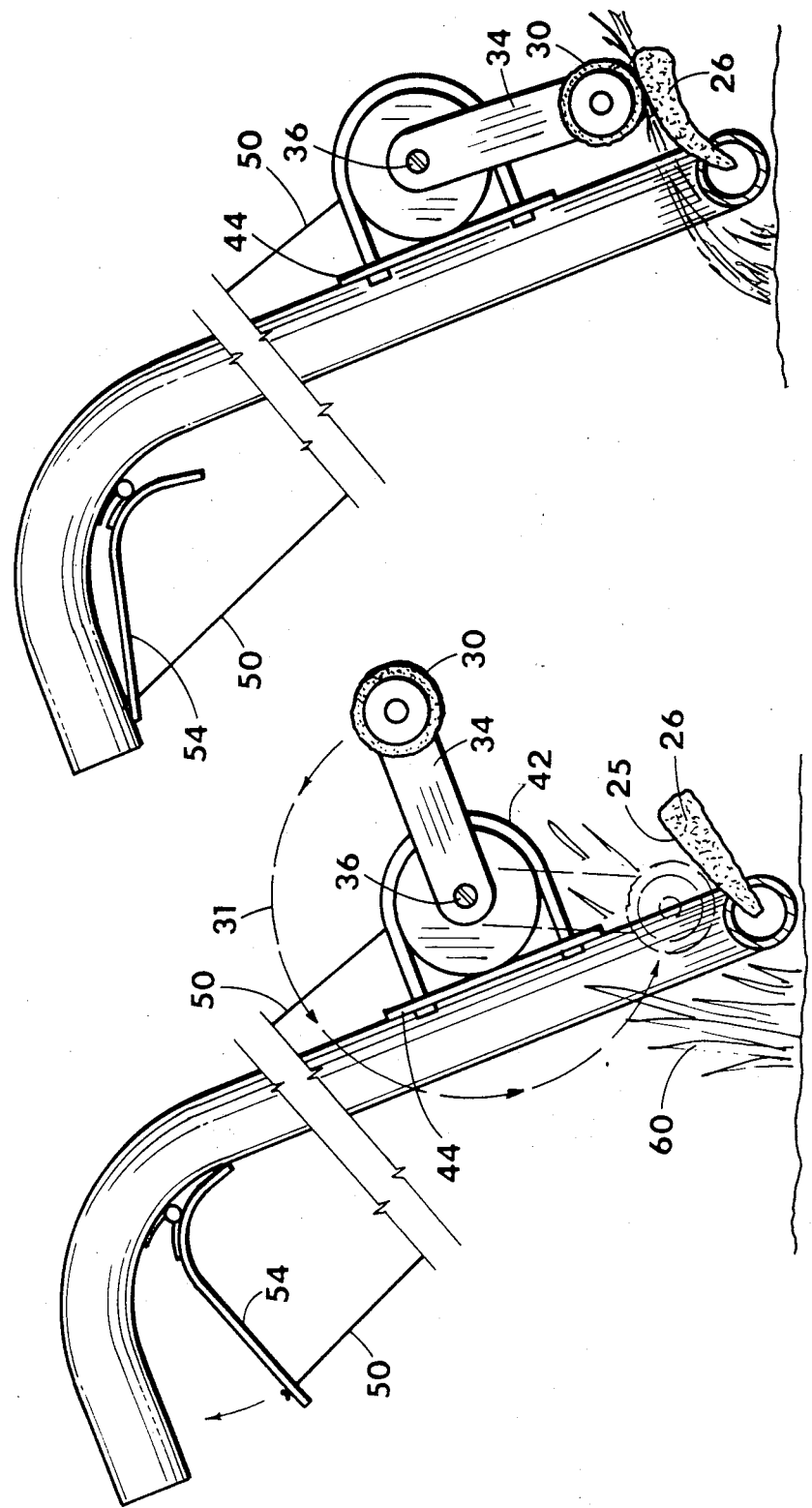

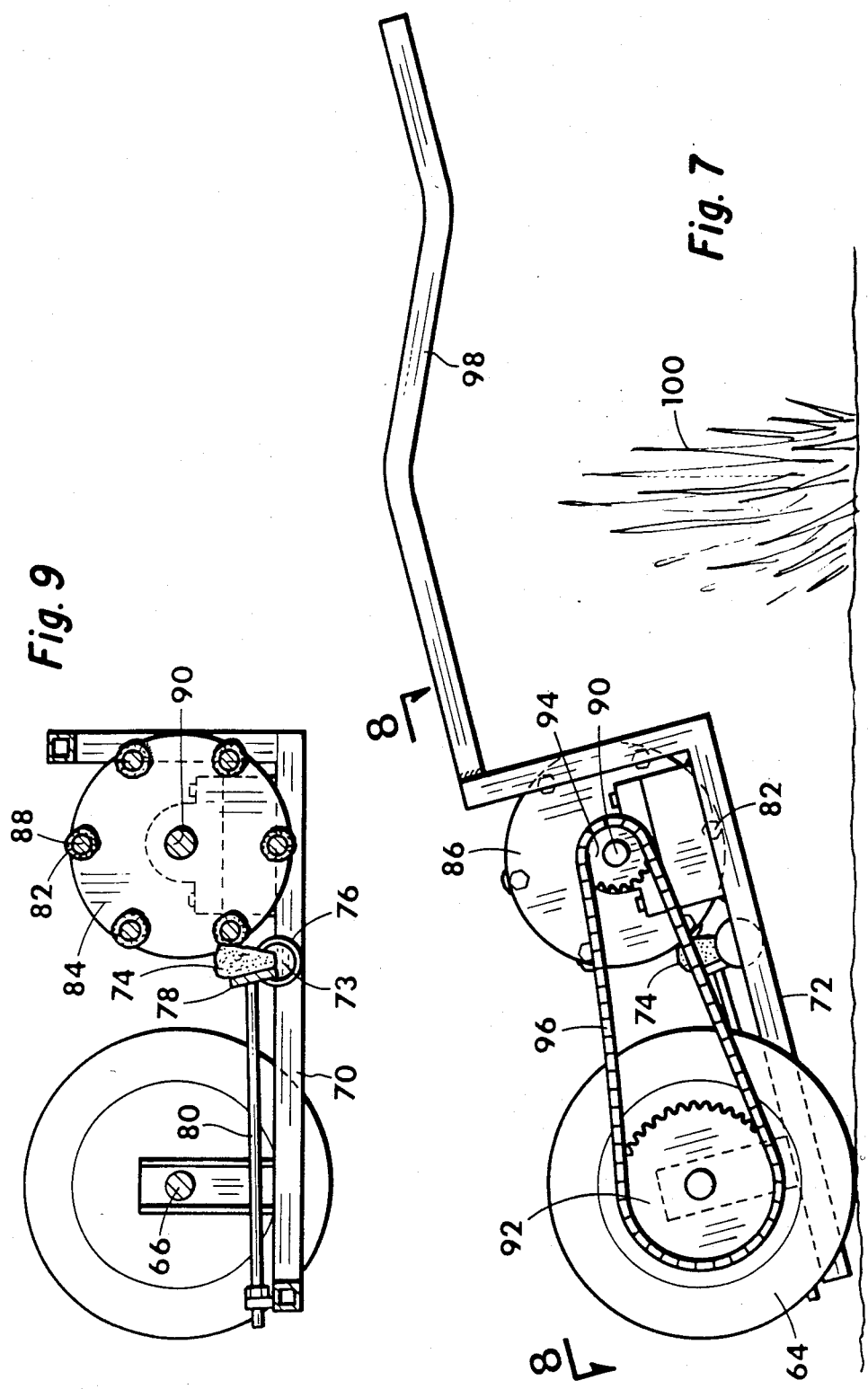

WEEDBEATER

BACKGROUND OF THE INVENTION

1. Field of the Invention

This invention relates to a method and apparatus for the application of liquid such as herbicides to plants.

2. Description of the Prior Art

The matter of destroying undesirable plants such as weeds from the desirable plants such as lawn grass by the use of herbicides has been a challenging problem for decades. Many prior methods have been tried. In some cases the herbicide is merely sprayed in liquid form on the weeds with the expectation that the herbicide has been selected so that it will only kill the weeds and not damage the vegetation such as lawn grass which is desired to be retained. In other cases the liquid herbicide may be applied by use ofan absorbing material which then is used to contact the weeds. In some cases rollers are mounted on frames and includes a liquid absorbing material which receives a herbicide from a dispensing conduit located above the roller.

SUMMARY OF THE INVENTION

This invention describes an apparatus which applies herbicides and colored dies to weed surfaces without contacting adjacent plants. The apparatus coats both sides of the weed surface for better application.

One embodiment includes a long hollow handle having an upper end and a lower end. A herbicide containing reservoir is mounted near the top end of the handle and a valve is provided to control the amount of herbicide which is permitted to flow from the container into the hollow handle. The lower end of the hollow handle is provided with a sponge assembly which has one relatively flat surface. A sponge assembly is connected to the lower end of the hollow handle so that herbicide released from the container will be absorbed by the sponge assembly for contacting weeds or other undesirable vegetation. A rotor assembly is connected to an arm which is connected to a shaft supported from the lower end of the handle such that as the roller arm supporting the roller is rotated, the roller rolls across the surface of the sponge assembly. The roller thus absorbs the herbicide from the sponge assembly and causes all of the force of the sponge surface to be coated. The shaft supporting the roller arm is spring loaded to a neutral position. A pull string is attached to the shaft and extends up the handle to a lever at the top. Movement of the lever causes the the string to rotate the shaft and roller arm thus rotating the roller across the sponge assembly. As soon as the lever is released a recoil spring causes the roller to roll back to its neutral position. In operation, the weeds are caught between the sponge assembly and the roller assembly and as the roller rolls across the sponge assembly the weeds are coated with the herbicide on both sides. This increases the effectiveness. In one operation for tall weeds the operator can stop the action of the roller assembly at sponge contact point and lift the entire assembly up in an upward motion to coat tall weeds or other undesirable vegetation with the herbicide.

Another embodiment includes a reel type applicator which is supported from an axle supported by two wheels and is adapted to be pulled behind a tractor for example. A sponge assembly is supported along the rear of the assembly and the horizontal members of the reel are roller with sponge-like coating and the device is adapted so that when the reel rotates the rollers contacts the sponge surface of the sponge assembly.

It is therefore an object of this invention to provide an apparatus whereby both sides of an undesirable plant such as a weed can be coated with a herbicide.

BRIEF DESCRIPTION OF THE DRAWINGS

FIG. 1 is a side elevation view of one embodiment of my herbicide applicator.

FIG. 2 is a view of the apparatus of FIG. 1 rotated ninety degrees.

FIG. 3 is a view taken along the line 3—3 of FIG. 1.

FIG. 4 is a view taken along the line 4—4 of FIG. 3.

FIG. 5 shows the roller of my roller assembly contacting the sponge assembly.

FIG. 6 illustrates a weed squeezed between the roller and the sponge assembly of my invention.

FIG. 7 shows another embodiment of my invention in which the sponge assembly is supported from an axle extending between two wheels and a reel assembly which has parallel roller members for contacting the sponge assembly.

FIG. 9 is a view taken along the line 9—9 of FIG. 8.

DETAILED DESCRIPTION OF THE INVENTION

Figure 8:
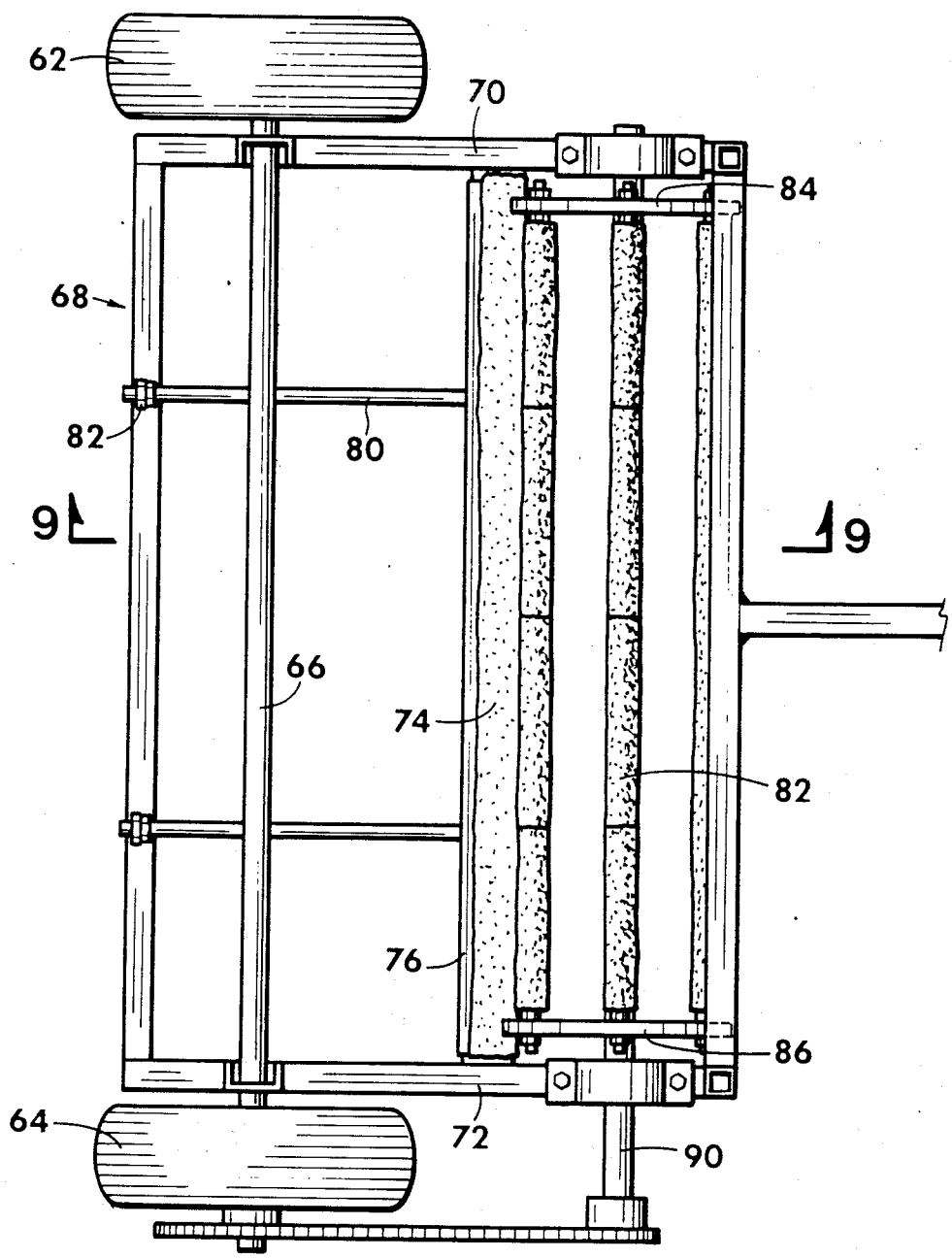
FIG. 8 is a view taken along the line 8—8 of FIG. 7.

Attention is first directed to FIGS. 1 and 2 to show the main features of the hand operated embodiment of my invention. Shown thereon is a hollow handle 10 which has an upper hand hold at the upper end and at the bottom end has an L-shaped extension member 14 which has an end closure 16. There is a reservoir 18 for holding herbicide or other desired liquid which is supported above needle valve 20 and conduit 20 which is fixedly and fluidly connected to hollow handle 10. There is thus a fluid or herbicide conveying channel 24 which extends from reservoir 18 through needle valve 20, conduit 22 including clear section 21 and horizontal extension 14 to sponge assembly 26. Sponge assembly 26 is made of material that will absorb the herbicide from reservoir 18 and as will be seen makes the herbicide available for contacting vegetation. Any suitable means such as a metal frame 28 can be used to hold the sponge 26 in the proper position.

Attention will now be directed to that part of the apparatus which provides means for moving a roller across the surface of the sponge assembly. This includes a roller 30 which is mounted on a shaft 32 which is supported from roller arm 34. Roller arm 34 is fixed to shaft 36 so that as shaft 36 rotates arm 34 rotates. Attention is directed to FIGS. 3 and 4 to show more clearly the total roller assembly. Shaft 36 is supported by roller bearing assembly 38 at its end nearest the roller arm 34. The bearing assembly 38 is supported in housing 40 which is supported from handle 10 by U-bolts 42 which are held by support plate 44 which is secured at weld 45 to handle 10. At the end of housing 40 plate 44 which is secured at weld 45 to handle 10. A the end of housing 40 opposite bearing assembly 38 is a recoil spring housing 42 in which is mounted recoil spring 46 which has end 47 which is secured in slot 48 of the end of shaft 36. One end of pull string 50 is connected at 52 to shaft 36. Pull string 50 has several loops wrapped around the shaft 52 before it exits the housing. The other end of the pull string 50 is connected to operating lever 54.

Attention is next directed to FIGS. 5 and 6 which shows the operation of the hand held unit just described. I will first let a few drops of herbicide out of reservoir 18 by carefully controlling it with needle valve 20 and observe the drops falling through clear section 21 of conduit 22. Before I start to apply this to the weed I will roll the roller 30 across the surface of sponge assembly 26. I accomplish this by merely pulling up on handle 54 to the position shown in FIG. 6. This causes the roller 30 to move along the surface of sponge assembly 26 which causes the surface of the sponge assembly to be fully coated and causes roller 30 to absorb some of the herbicide thereon. The movement of roller 30 is indicated by dashed line 31. In operation for killing weeds I will place the undesirable vegetation 60 adjacent pad 26 and then by pulling up on lever 54 roller 30 will roll across the top of the vegetation 60 and the herbicide will contact both sides. As clearly shown in FIGS. 5 and 6 the axis of rollers 30 is horizontal when used. The embodiment of FIGS. 5 and 6, the roller 30 does not rotate a full 360° but rotates from the position shown in FIG. 5 along dashed line 31 to the approximate position shown in FIG. 6. The lever 54 has sufficient movement so that pull string 50 will unwind the proper amount to rotate the shaft to obtain the desired rotation of roller arm 34. If I have tall vegetation 60 I can "lock" the device in the position shown in FIG. 6 with roller 30 against the surface 27 of the sponge assembly. There the operator can lift up on the entire mechanism thus coating all leaf surfaces that are trapped between the roller and the sponge. This is especially useful in covering such things as long burmuda runners growing in the shrubery or tall Johnson grass One mixture of herbicide which I have used successfully in reservoir 18 is fifty percent Roundup ® a product of Monsanto Chemical Company and fifty percent water with a small amount of dye. The dye permits the operators to readily see whether the undesirable vegetation is coated with the herbicide. Further tsting may show that I can use a much smaller percentage of the herbicide and still obtain effective coating to kill the undesirable vegetation.

Attention is now directed to FIGS. 7, 8 and 9 to show another embodiment of my invention. This still uses the principle of coating both sides of the undesirable vegetation by trapping the vegetation between a sponge containing a herbicide and a roller containing a herbicide. However, the mechanism is considerably different in that in FIGS. 7, 8 and 9 I use a reel type mechanism. I have wheels 62 and 64 supporting an axle 66. Axle 66 supports a frame 68 having end members 70 and 72. An elongated sponge pad 74 is supported by support member 76 between end members 70 and 72. As shown clearly in FIG. 9 sponge 74 has support bar 78 to hold it in the proper position. The sponge 74 can be attached thereto in any acceptable manner. The sponge 74 extends through a slot in member 76 which is preferably a pipe. It is in this pipe 76 that the herbicide is placed. The herbicide mixture can be placed in pipe 76 by any known method such as through a port with a cap on it, not shown, or the pad 74 can be removed and the herbicide fluid 73 put in and then the pad 74 again placed in position. The sponge 74 will act as a wick and lift the fluid until the sponge is saturated. Support frame 78 is supported from frame 68 by support rod 80 which is attached thereto by nut assembly 82. Sponge 74 functions very closely like the sponge 26 of FIGS. 1 to 6.

Attention is now directed to that part of FIGS. 7, 8 and 9 which show the reel assembly. A plurality of parallel rollers 82, each coated with a liquid absorbing material, are supported between end discs 84 and 86. These rollers 82 are each mounted on a shaft 88 which is rotatably mounted in end plates 84 and 86. A central shaft 90 supports end plates 84 and 86 and is fixed thereto. Thus, rotation of shaft 90 rotates the reel assembly. In one embodiment sprocket wheel 92 is fixed to wheel 64 such that rotation of wheel 64 rotates sprocket 92. A sprocket 94 is fixed to shaft 90 such that rotation of sprocket 94 rotates shaft 90 and end disc 84 and 86. A chain 96 is provided for sprocket wheels 92 and 94. A handle 98 is provided so that the device of FIGS. 7, 8 and 9 can be pulled either by hand or behind a tractor. Alternatively, a motor, not shown, may be provided to rotate shaft 90 in any convenient manner such as by gears, belts, etc.

In operation the reel type herbicide dispenser is described operating similarly to that of the hand-held herbicide applicator previously described. The reel type applicator will be pulled over the undesirable weeds 100 and the reel rollers 82 will trap the weeds 100 between a roller and the elongated sponge 74. This will cause coating on both sides of the weeds 100. If the reel is turned by a motor and not by rotation of wheels 64, one can stop and keep the applicator of FIGS. 7, 8 and 9 in one spot and rotate the reel by the motor. This may be useful if the undesirable vegetation in one area is especially heavy.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus to treat undesirable vegetation with a herbicide which comprises:
    a first and a second wheel spaced apart and an axle supporting said spaced apart wheels;
    a frame supported from said axle;
    a supply sponge pad supported from said frame and extending between said wheels;
    a reel supported by said frame, each said reel having a plurality of arms circumferentially spaced about said reel, each arm is parallel to said axle, each said arm having an arm sponge mounted thereon for retaining said herbicide, said arms being positioned with respect to said sponge pad so that rotation of said reel causes said arm sponges to intermittently contact said supply sponge pad.

2. An apparatus as defined in claim 1 including drive means connecting one of said wheels to said reel so that rotation of such wheel rotates said reel.

3. A weedkiller apparatus for use with a herbicide which comprises:
    a handle having a first end and a second end;
    a pad supported by said handle;
    supply means for supplying a herbicide to said pad;
    a roller;
    a roller arm rotatably supporting said roller, said roller arm supporting said roller from said handle such that said roller is movable between a first position where the roller is spaced from said pad and a second position where said roller contacts said pad;

action means to move said roller between said first and second position such that said roller rolls over at least a part of said pad, said action means including:

a shaft supported from said handle near said second end;

a spring to bias said roller arm to said first position;

a linkage element attached to said shaft, said linkage element extended along said handle;

a lever pivotally attached to the first end of said handle, said linkage element attached to said lever whereby movement of said lever arm causes said roller to contact said pad.

4. An apparatus as defined in claim 1 including drive means to drive said shaft.

5. An apparatus to treat undesirable vegetation with a herbicide which comprises:

a frame;

an axle supported from said frame;

a supply sponge pad supported from said frame;

a reel supported by said frame, each said reel having a plurality of arms circumferentially spaced about said reel, each arm is parallel to said axle, each said arm having an arm sponge mounted thereon for retaining said herbicide, said arms being positioned with respect to the sponge pad so that rotation of said reel causes said arm sponges to intermittently contact said supply sponge pad.

* * * * *